United States Patent
Ku et al.

(10) Patent No.: US 7,397,772 B2
(45) Date of Patent: Jul. 8, 2008

(54) METHOD AND APPARATUS FOR ACOUSTIC ECHO CANCELLATION IN A COMMUNICATION SYSTEM PROVIDING TTY/TDD SERVICE

(75) Inventors: Jung-Woo Ku, Seoul (KR); Byung-Gun Park, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 1029 days.

(21) Appl. No.: 10/347,233

(22) Filed: Jan. 21, 2003

(65) Prior Publication Data

US 2003/0137946 A1 Jul. 24, 2003

(30) Foreign Application Priority Data

Jan. 21, 2002 (KR) .................. 10-2002-0003308

(51) Int. Cl.
*H04L 12/16* (2006.01)
*H04Q 11/00* (2006.01)
*H04Q 7/00* (2006.01)
*H04B 3/20* (2006.01)

(52) U.S. Cl. .................. 370/286; 370/268; 370/269; 370/328

(58) Field of Classification Search .................. 370/268, 370/269, 286, 328, 349; 379/3, 52, 406.01–406.16
See application file for complete search history.

(56) References Cited

U.S. PATENT DOCUMENTS

| | | | |
|---|---|---|---|
| 5,081,673 A | 1/1992 | Engelke et al. | |
| 5,432,837 A | 7/1995 | Engelke et al. | |
| 5,867,574 A * | 2/1999 | Eryilmaz ................ | 379/388.04 |
| 5,974,116 A | 10/1999 | Engelke et al. | |
| 6,307,921 B1 | 10/2001 | Engelke et al. | |
| 6,381,472 B1 * | 4/2002 | LaMedica et al. ............ | 455/560 |
| 6,434,198 B1 * | 8/2002 | Tarraf ........................ | 375/259 |
| 6,993,126 B1 * | 1/2006 | Kyrylenko et al. ........... | 379/392 |
| 2002/0057765 A1 * | 5/2002 | Hyziak et al. ................ | 379/52 |
| 2003/0053603 A1 * | 3/2003 | Vejlgaard ...................... | 379/52 |
| 2003/0091162 A1 * | 5/2003 | Haun et al. .................... | 379/80 |
| 2003/0119518 A1 * | 6/2003 | Cleveland et al. ............ | 455/450 |
| 2004/0076271 A1 * | 4/2004 | Koistinen et al. ........ | 379/88.11 |

OTHER PUBLICATIONS

"Meeting Summary Report" TTY Forum 20, Online; Dec. 11, 2001, pp. 1-115, XP002239160, Washington, DC; Retrieved from the Internet on Apr. 17, 2003; URL:http://www.atis.org/pub/ttyforum/20tty-draft.doc.

(Continued)

*Primary Examiner*—Kwang Bin Yao
*Assistant Examiner*—Jutai Kao
(74) *Attorney, Agent, or Firm*—Roylance, Abrams, Berdo & Goodman, L.L.P.

(57) ABSTRACT

A method and apparatus are disclosed for canceling acoustic echo generated during transmission of text information in a communication system supporting a TTY/TDD service. When a mobile-to-land call is established between a mobile subscriber and a PSTN subscriber, a decoder notifies an encoder of detection of TTY/TDD text in a BS vocoder. The encoder then transmits a packet having silence information, which prevents acoustic echo reproduction of the text in the TTY/TDD device.

14 Claims, 9 Drawing Sheets

OTHER PUBLICATIONS

"TTY/TDD Extension to TIA/EIA 136-410 Enhanced Full Rate Speech Codec" TIA/EIA Interim Standard IS-823A, Sep. 2001, pp. 1-23, XP002239161.

Electronic Industries Alliance; TIA/EIA Interim Standard; TTY/TDD Extension to TIA/EIA 136-410 Enhanced Full Rate Speech Codec; Sep. 2001.

ATIS Conference Center; TTY Forum—20 Meeting Summary Report; Dec. 11, 2001.

Meeting Summary Report; TTY Forum—20; Dec. 11, 2001; pp. 1-115.

TTY/TDD Extension of TIA/EIA 136-410 Enhanced Full Rate Speech Codec; Sep. 2001; pp. 1-31.

* cited by examiner

METHOD AND APPARATUS FOR ACOUSTIC ECHO CANCELLATION IN A COMMUNICATION SYSTEM PROVIDING TTY/TDD SERVICE

PRIORITY

This application claims priority under 35 U.S.C. § 119 to an application entitled "Method and Apparatus for Acoustic Echo Cancellation in a Communication System Providing TTY/TDD Service" filed in the Korean Industrial Property Office on Jan. 21, 2002 and assigned Serial No. 2002-3308, the contents of which are expressly incorporated herein by reference.

BACKGROUND OF THE INVENTION

1. Field of the Invention

The present invention relates generally to enhancing communication capabilities in a communication system, and in particular, to a method and apparatus for canceling acoustic echo in a communication system providing a TTY/TDD service.

2. Description of the Related Art

Communication technology, particularly mobile communication technology, has been developed to additionally provide data service as well as voice service. Communication systems provide additional services to satisfy various user demands. One of the additional services is a TTY/TDD service. The term "TTY" derives from "Teletype", which is a registered trademark of the Teletype Corporation. "TDD", is an abbreviation of the phrase "telecommunications device for the deaf". TTY/TDD services enable telephone calls to the deaf or hearing-impaired people.

Implementation of the TTY/TDD service requires a TTY/TDD device. The TTY/TDD device comprises a keyboard, a MODEM (Modulator/DEModulator), and a display connected to a wired telephone via the MODEM. The TTY/TDD device converts PCM (Pulse Code Modulation) signal from the other party to text messages and displays them on the display. It also converts text messages received from the keyboard to PCM signals and provides the PCM signal to the wired telephone. Thus, the deaf can conduct a telephone call.

In connection with the TTY/TDD service, the U.S. has created ground rules to provide services to the deaf and hard of hearing persons since the late 1970's. In 1990, the ADA (the Americans with Disabilities Act) was instituted to enforce the rights of individuals with disabilities. Today, it has been decided that a TTY/TDD functionality shall be provided in the standards of a mobile communication system. As is well known to those skilled in the art of the invention, 13K QCELP (Qualcomm Code Excited Linear Prediction Code) and EVRC (Enhanced Variable Rate Code) vocoders are widespread voice compression techniques in $2^{nd}$ and $3^{rd}$ generation wireless communications systems. The TTY/TDD functionality is implemented as IS733-3 and IS127-4 in these vocoders. IS-733-3 defines the TTY/TDD functionality of the 13K QCELP vocoder, and IS-127-4, that of the EVRC vocoder.

The encoder of such a vocoder processes voice samples on a 20-ms frame basis and transmits processed voice information in packets. The decoder of the vocoder reproduces the voice samples by processing received voice packets in an order reverse to the encoder operation. When the TTY/TDD functionality is implemented, the encoder determines whether input PCM (pulse code modulation) samples are voice or TTY/TDD text. In the case of voice, the encoder transmits voice information in packets. In the case of TTY/TDD text, it transmits text information in packets. The decoder determines whether a received packet is voice information or TTY/TDD text information and reproduces voice samples or TTY text tones according to the result of the determination. The TTY/TDD functionality supports voice carryover/hearing carryover (VCO/HCO). VCO allows people who have difficulties in hearing clearly through the telephone to use a TTY without typing. They only use the TTY for reading during the inbound direction of the call. They talk to their party by speaking into a microphone. Similarly, HCO allows a person with a speech disability to hear a response from their party directly. A communication system equipped with vocoders having these options enables communications between a person without any speech or hearing disabilities and a hearing-impaired person or between hearing-impaired persons.

Communication systems equipped with vocoders having the TTY/TDD functionality are illustrated in FIGS. 1, 2A and 2B. FIG. 1 illustrates the network configuration of a communication system that allows a TTY/TDD service between a mobile subscriber and a subscriber to the public switched telephone network (PSTN), and FIGS. 2A and 2B illustrate the network configuration of a communication system that allows a TTY/TDD service between mobile subscribers.

The TTY/TDD service in these communication systems has at least the following two problems:

(1) In the case when a mobile-to-land call (an MtoL call) is established between a mobile and PSTN subscriber (voice transmission/reception), as illustrated in FIG. 1, the acoustic echo that can be generated from a land phone 111 will not negatively impact the communication quality of the call as perceived by the mobile phone (TTY/TDD phone) 103. The reason why the call-quality is not negatively impacted is because the signal length and delay of the acoustic echo are inaudibly small. That is, under an environment with voice data only, even if acoustic echo is caused in the land phone 111, the strength of a PCM signal delivered from the speaker to the microphone of the land phone 111 is very small and the microphone is sufficiently apart from the speaker. Thus the communication quality the TTY/TDD phone 103 perceives is good. Therefore, the acoustic echo is not a problem.

However, in the case of transmission/reception of TTY/TDD text information, a TTY/TDD device 101 substantially perceives the signal strength of the acoustic echo generated from the land phone 111. The TTY/TDD device 101 then reproduces the TTY/TDD information due to the acoustic echo involved with transmission of the TTY/TDD information. Specifically, under an environment having coexistent voice and TTY/TDD text, a PCM signal of TTY/TDD text tones output from the speaker of the land phone 111 is delivered to its microphone. However small its signal strength is, an encoder 105b in a vocoder 105 within a base station (BS) 105 perceives the PCM signal substantially and transmits the TTY/TDD text information in a packet to the TTY/TDD phone 103. Therefore, the TTY/TDD device 101 connected to the TTY/TDD phone 103 reproduces the TTY/TDD text. Consequently, the acoustic echo generated from the land phone 111 influences the TTY/TDD device 101.

(2) When a mobile-to-mobile (MtoM) trans-coding call is established between mobile subscribers as illustrated in FIGS. 2A and 2B, acoustic echo caused in one TTY/TDD phone 311 leads to reproduction of transmitted TTY/TDD text information in a TTY/TDD device 301 connected to the other TTY/TDD phone 303. Under the environment of voice data only, even if acoustic echo is generated from the TTY/TDD phone 311, the strength of a PCM signal delivered from its speaker to its microphone is negligibly small. Therefore, there is no influence on the communication quality of the other TTY/TDD phone 303.

In the environment of voice information coexisting with TTY/TDD text information, however, PCM TTY/TDD text tones delivered from the speaker to the microphone of the TTY/TDD phone 311 are substantially sensed in its encoder 311*b*. The encoder 311*b* will sense the PCM TTY/TDD text tones because the encoder 311*b* is specifically configured to sense the TTY/TTD text tones, however small they are, in accordance with the "3GPP2 C.S0028 Version 1.0 CDMA TTY/TDD Minimum Performance Specification." Therefore, the TTY/TDD device 301 connected to the other TTY/TDD phone 303 reproduces the TTY/TDD text due to the acoustic echo.

SUMMARY OF THE INVENTION

Accordingly, it is an object of the present invention to provide a method and apparatus for canceling acoustic echo involved in transmission/reception of TTY/TDD text information in a communication system providing a TTY/TDD service.

It is another object of the present invention to provide a method and apparatus for canceling acoustic echo involved in transmission of TTY/TDD text information from a mobile subscriber to a PSTN subscriber in a communication system providing a TTY/TDD service between a mobile subscriber and a PSTN subscriber.

It is a further object of the present invention to provide a method and apparatus for canceling acoustic echo involved in transmission of TTY/TDD text information from a mobile subscriber to another mobile subscriber in a communication system providing a TTY/TDD service between mobile subscribers.

To achieve these and other objects of the present invention, an embodiment of the present invention, provides a system and method to cancel acoustic echo generated from an external communication network during transmission of text information from a BS to the external communication network in a communication system having the BS, wherein the MS is connected wirelessly to the BS and has a TTY/TDD device for transmitting and receiving text information, and the BS determines whether text information has been received from the TTY/TDD device of the MS. If the text information has been received, the BS generates a packet which includes silence information and transmits it to the TTY/TDD device of the MS. The system and method of this embodiment of the present invention, thus prevents acoustic echo which causes the reproduction of the text information in the TTY/TDD device.

Another embodiment of the present invention, provides a system and method to cancel acoustic echo generated from a land phone during transmission of text information from a TTY/TDD device to a second TTY/TDD device, in a communication system having a BS, an MS connected wirelessly to the BS, and wherein the MS has the first TTY/TDD for transmitting and receiving text information. The system further includes a PSTN and an MSC for connecting the BS to the PSTN, and wherein the land phone is connected to the PSTN, and has the second TTY/TDD device for transmitting and receiving text information. In accordance with this embodiment of the invention, a BS vocoder determines whether text information has been received from the first TTY/TDD device of the MS. If the text information has been received, the BS vocoder generates a packet including silence information and transmits it to the first TTY/TDD device through the MS. In this manner, therefore, the acoustic echo of the land phone that causes reproduction of the text information in the first TTY/TDD device is prevented.

A further aspect of the present invention provides a system and method to cancel acoustic echoes generated from a second MS during transmission of text information from a first TTY/TDD device to a second TTY/TDD device. The communication system in accordance with this embodiment of the invention comprises a first BS, a second BS, an MSC for connecting the first and second BSs, a first MS connected wirelessly to the first BS, and wherein the second MS is connected wirelessly to the second BS. The system in accordance with this embodiment of the invention further comprises the first TTY/TDD device of the first MS, for transmitting and receiving text information, and the second TTY/TDD device of the second MS, for transmitting and receiving text information, and wherein the second BS determines whether text information has been received from the first TTY/TDD device of the first BS and the MSC. If the text information has been received, the second BS discontinues reception of text information from the second MS for a predetermined time.

BRIEF DESCRIPTION OF THE DRAWINGS

The novel features believed characteristic of the invention are set forth in the appended claims. The invention itself, however, as well as other features and advantages thereof will be best understood by reference to the detailed description of the specific embodiments which follows, when read in conjunction with the accompanying drawings, in which:

DETAILED DESCRIPTION OF THE PREFERRED EMBODIMENTS

Figure 1:
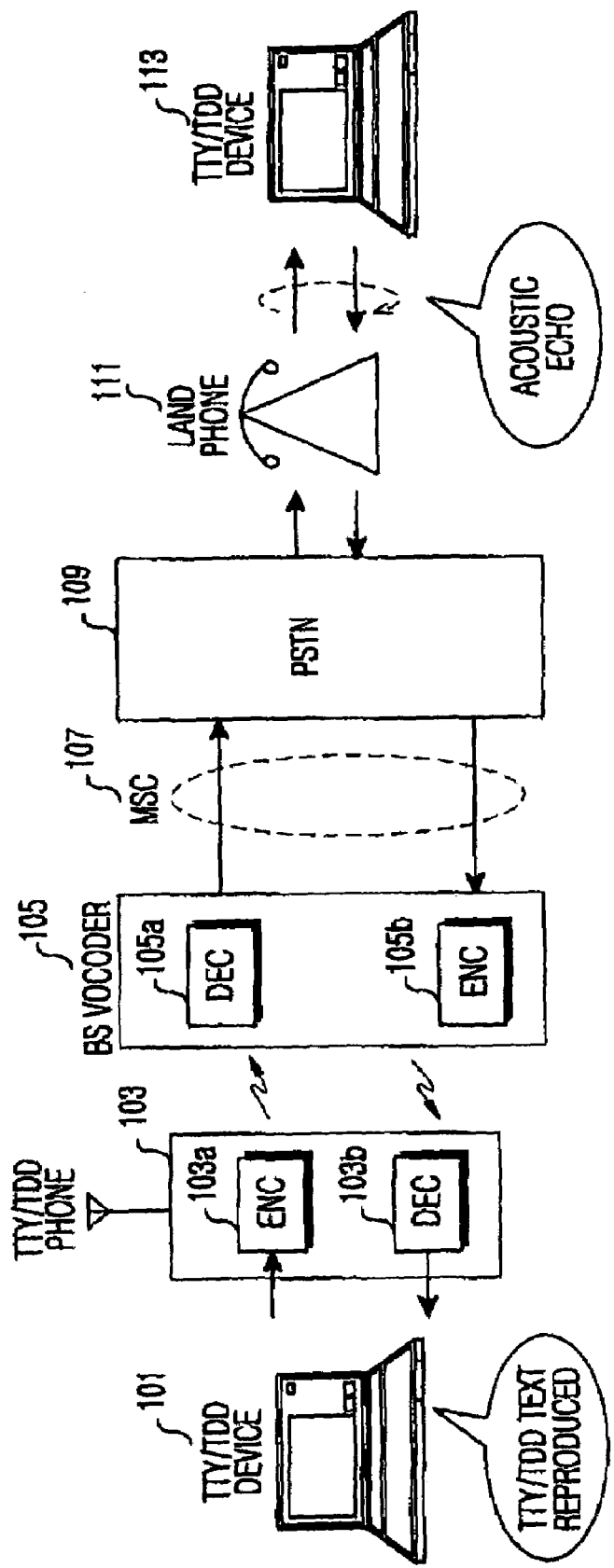
FIG. 1 illustrates a conventional communication system providing a TTY/TDD service in which acoustic echo is generated.

Several embodiments of the present invention will now be described in detail with reference to the accompanying drawings. In the drawings, the same or similar elements are denoted by the same reference numerals even though they are depicted in different drawings. In the following description, a detailed description of well-known functions or constructions incorporated herein has been omitted for conciseness.

The embodiments of the present invention described herein pertain to cancellation of acoustic echo generated during transmission of text information in a mobile communication system providing a TTY/TDD service, i.e., communication systems equipped with TTY/TDD devices. Acoustic echo cancellation is implemented in at least two embodiments according to the present invention.

The first embodiment of the present invention cancels acoustic echo generated when a hearing-impaired mobile subscriber inputs text information to call a normal or hearing-impaired PSTN subscriber using a TTY/TDD device. In accordance with the first embodiment of the present invention, upon set up of an MtoL call, a TTY/TDD text detector 115, in a BS vocoder detects TTY/TDD text, and a blank packet generator 117 then transmits a blank packet containing silence information. In this embodiment, an MtoL call is a call established between a mobile subscriber and a PSTN subscriber, for conversation over the telephone. If the TTY/TDD text detector fails to detect TTY/TDD text, an encoder transmits a packet. The second embodiment of the present invention cancels acoustic echo generated when a hearing-impaired mobile subscriber inputs text information to call another normal or hearing-impaired mobile subscriber using a TTY/TDD device. In accordance with the second embodiment of the present invention, upon set up of an MtoM transcoding call, a PCM signal is provided to an encoder and a TTY/TDD text detector is provided in a BS vocoder. In this embodiment, an MtoM call is a call established between mobile subscribers, for conversation over the telephone. The count of a delay counter depends on the type of information (silence, voice, or TTY/TDD text) detected in the TTY/TDD text detector. A decoder operates, or a PCM mute generator sets a PCM signal as zero according to the count in the BS vocoder.

First Embodiment

Figure 3A:
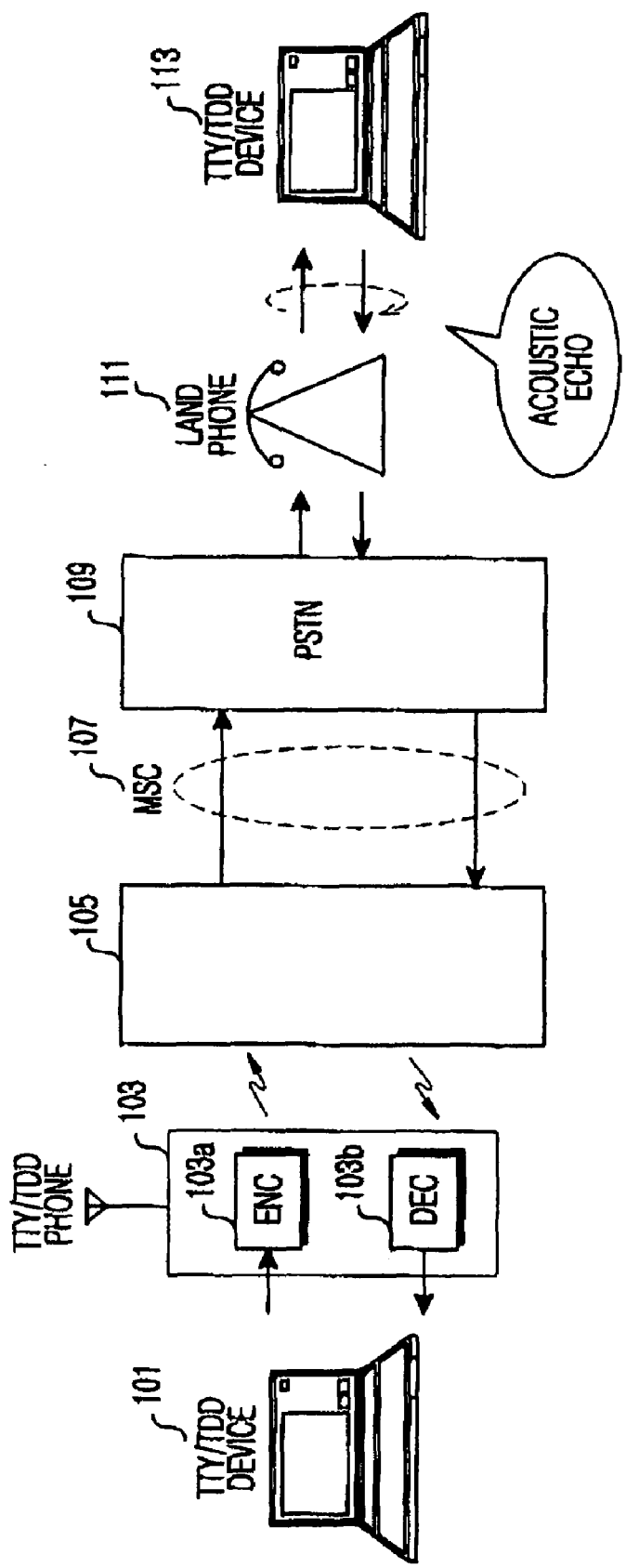
FIGS. 3A and 3B illustrate an example of a system for canceling acoustic echo generated from a communication system providing TTY/TDD service according to an embodiment of the present invention.
Figure 3B:
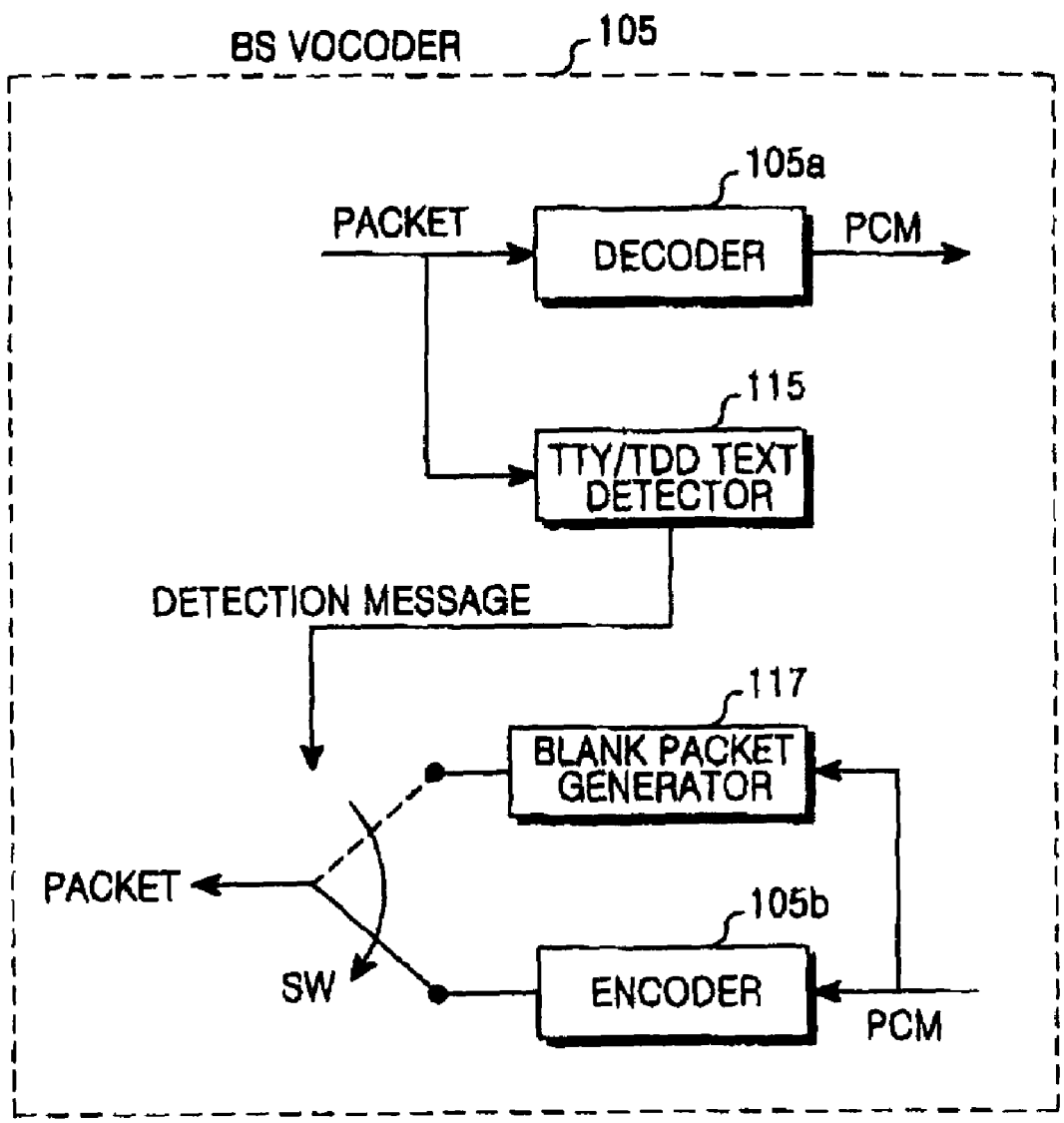

FIG. 3A illustrates the configuration of a system for canceling acoustic echo generated from a communication system providing a TTY/TDD service according to the first embodiment of the present invention. FIG. 3B is a block diagram of the BS vocoder 105 illustrated in FIG. 3A.

Referring to FIG. 3B, the BS vocoder 105 of the present invention includes a TTY/TDD text detector 115, a blanket packet generator 117, and a switch SW in addition to the decoder 105a and the encoder 105b of the BS vocoder 105 illustrated in FIG. 1. A packet received from the TTY/TDD phone 103 is applied to the input of the decoder 105a and the TTY/TDD text detector 115. The decoder 105a decodes the packet and outputs a PCM signal to a mobile switching center (MSC) 107. The TTY/TDD text detector 115 detects TTY/TDD text if the packet contains the TTY/TDD text and outputs a detection message representing the detection result. A PCM signal received from the MSC 107 is applied to the input of the encoder 105b and the blank packet generator 117. The encoder 105b encodes the PCM signal and outputs a packet. The blank packet generator 117 generates a blank packet including silence information from the PCM signal.

Referring to FIGS. 3A and 3B, it can be seen that the BS vocoder 105 comprises the TTY/TDD text detector 115 for detecting TTY/TDD text, the blank packet generator 117 for generating a blank packet and outputting the blank packet according to a detection message received from the TTY/TDD text detector 115. The first embodiment of the present invention is implemented in a communication system that has a BS, a TTY/TDD phone 103 connected wirelessly to the BS, a first TTY/TDD device 101 for exchanging text information with the TTY/TDD phone 103, a PSTN 109, a MSC 107 for connecting the BS to the PSTN 109, a land phone 111 connected to the PSTN 109 by cable, and a second TTY/TDD device 113 connected to the land phone 111, for exchanging text information with the land phone 111. The first TTY/TDD device 101 can be connected to the TTY/TDD phone 103 wirelessly or by cable as illustrated in FIG. 3A. In addition, the first TTY/TDD device 101 can be incorporated into the TTY/TDD phone 103. The same means for incorporation can be applied to the second TTY/TDD device 113.

Figure 4:
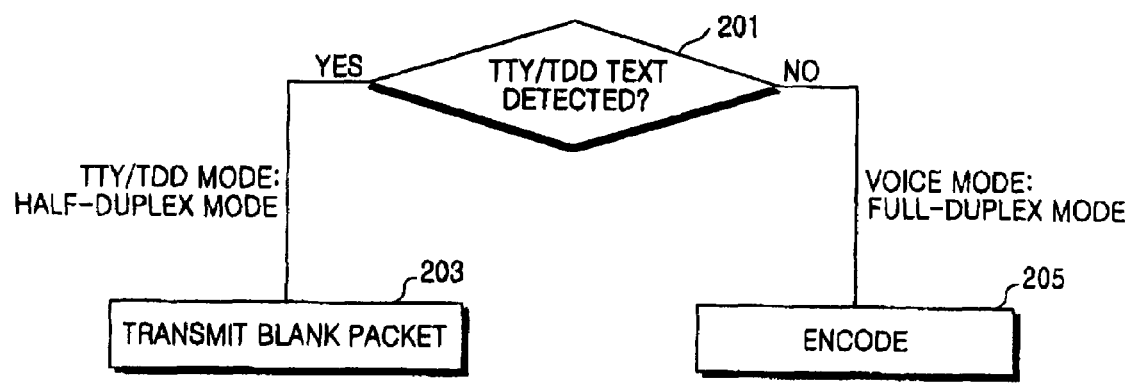
FIG. 4 is a flowchart illustrating an example of operations for providing acoustic echo cancellation according to the embodiment of the present invention.

FIG. 4 is a flowchart illustrating a method for providing acoustic echo cancellation according to the embodiment of the present invention. This operation is for canceling acoustic echo generated during transmission of text information from the first TTY/TDD device 101 to the second TTY/TDD device 113. The acoustic echo cancellation method includes the steps of detecting text information in a packet received from the first TTY/TDD device 01 through the TTY/TDD phone 103 by the TTY/TDD text detector 115 (step 201). A blank packet containing silence information is generated if the text information has been received in the BS vocoder 105 ("Yes" path from step 201), and then transmitted to the first TTY/TDD device 101 through the TTY/TDD phone 103 by the blank packet generator 117 (step 203). Therefore, acoustic echo is prevented which leads to reproduction of the text information in the first TTY/TDD device 101.

Referring to FIGS. 3A, 3B and 4, when the TTY/TDD device 101 transmits TTY/TDD text to the TTY/TDD 113 connected to the land phone 111, the encoder 105b of the BS vocoder 105 can sense acoustic echo generated from the land phone 111. Thus, the encoder 105b feeds the transmitted TTY/TDD text back in packets to the TTY/TDD phone 103. A decoder 103b of the TTY/TDD phone 103 generates corresponding TTY/TDD text tones and thus the TTY/TDD device 101 reproduces the TTY/TDD text. Consequently, the failure of the BS vocoder 105 in canceling the acoustic echo of the land phone 111 brings about the echo of the TTY/TDD text. This phenomenon arises because the TTY/TDD functionality is additionally implemented in the BS vocoder 105, and the encoder 105b of the BS vocoder 105 is so configured as to perceive the PCM signal of TTY/TDD text, regardless of its strength in accordance with the "3GPP2 C.S0028 Version 1.0 CDMA TTY/TDD Minimum Performance specification".

For cancellation of the acoustic echo, the BS vocoder 105 further includes the TTY/TDD text detector 115 connected in parallel to the decoder 105a, and the blank packet generator 117 connected in parallel to the encoder 105b. When the TTY/TDD text detector 115 detects TTY/TDD text, the encoder 105b is made inoperative and instead, the blank packet generator 117 transmits a blank packet having silence information to the TTY/TDD phone 103. If, however, the TTY/TDD text detector 115 fails to detect TTY/TDD text, the encoder 105b operates normally and transmits a packet received from the MSC 107 to the TTY/TDD phone 103.

Referring again to FIG. 4, the TTY/TDD text detector 105 will detect TTY/TDD text if the TTY/TDD text is included in a packet received from the TTY/TDD phone 103, as shown in step 201. Upon detection of the TTY/TDD text, the BS vocoder 105 is set to a TTY/TDD mode. Otherwise, it operates in a voice mode. In the TTY/TDD mode, the blank packet generator 117 generates silence information and transmits the silence information in a blank packet to the TTY/TDD phone 103 in step 203. In the voice mode, the encoder 105b normally transmits a voice packet received from the MSC 107 to the TTY/TDD phone 103 in step 205. These operations are possible because the system operates in a half-duplex mode during transmission of TTY/TDD text. The system operating in half-duplex mode means that when the TTY/TDD device 101 transmits TTY/TDD text, the land phone 111 is prevented from transmitting voice information or TTY/TDD text. When the land phone 111 transmits voice information or TTY/TDD text, the encoder 105b operates normally since it has already received voice mode information from the decoder 105a.

Second Embodiment

Figure 5A:
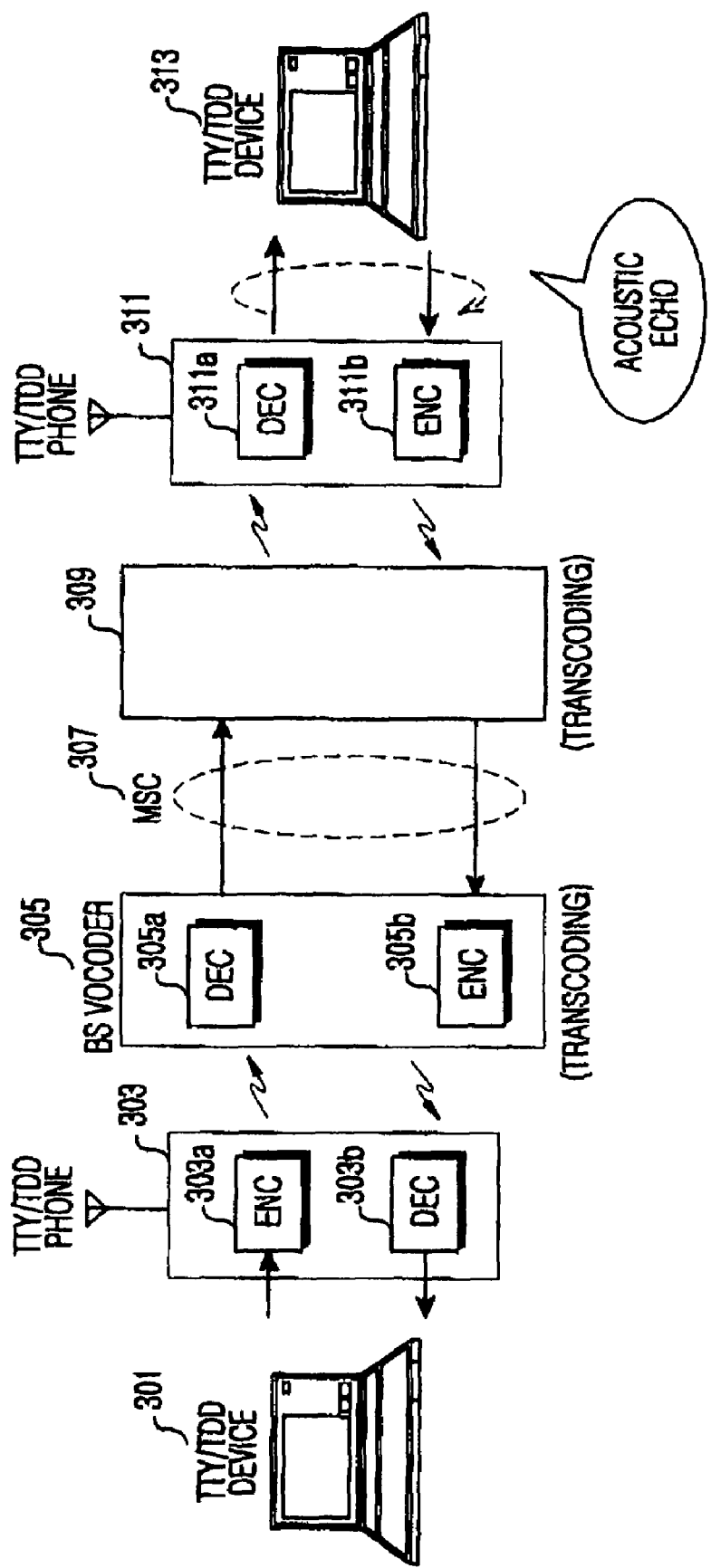
FIGS. 5A and 5B illustrate an example of a system for canceling acoustic echo generated from a communication system providing the TTY/TDD service according to another embodiment of the present invention.
Figure 5B:
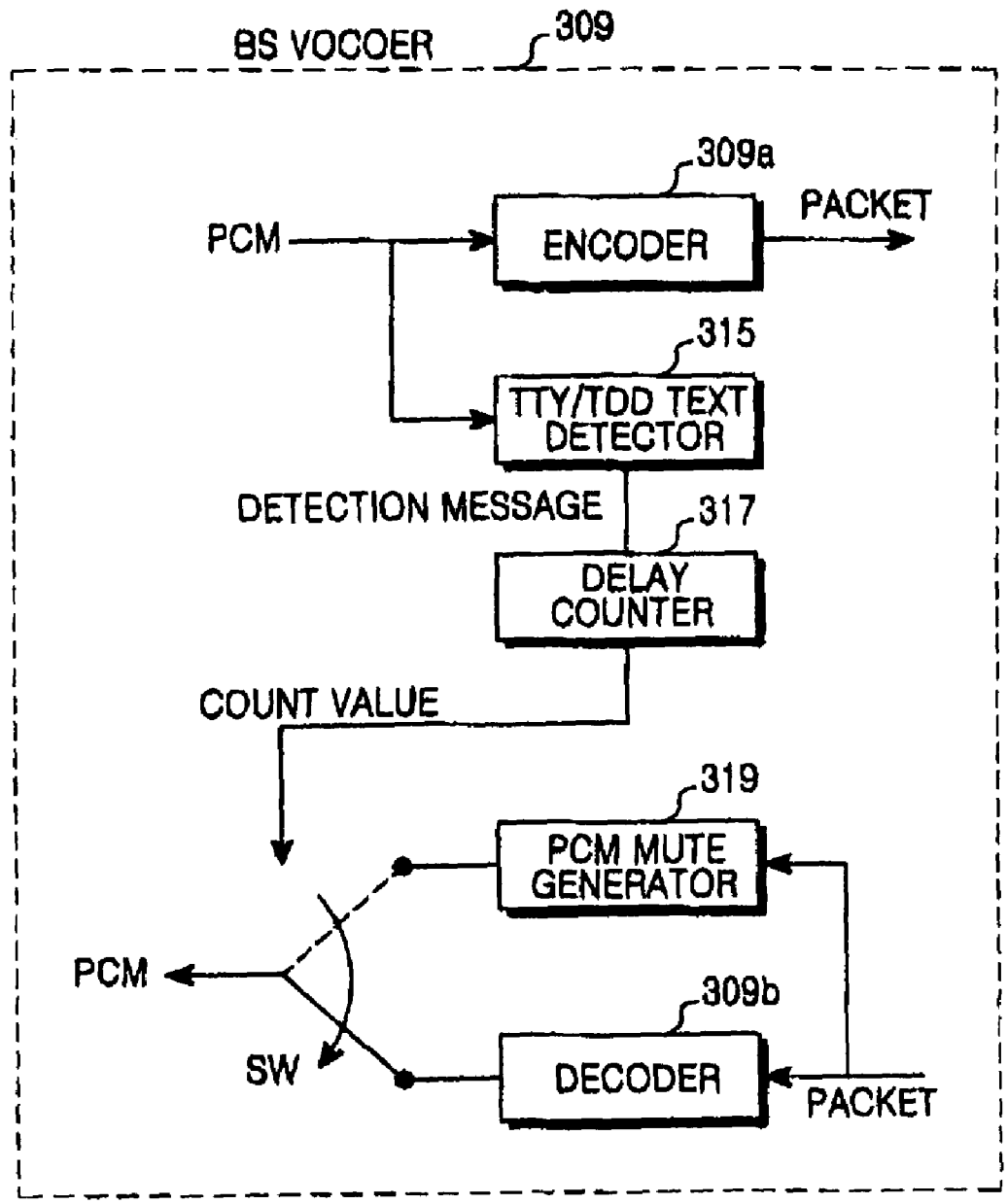

FIG. 5A illustrates the configuration of a system for canceling acoustic echo generated from a communication system providing a TTY/TDD service according to the second embodiment of the present invention. FIG. 5B is a block diagram of the BS vocoder 309 illustrated in FIG. 5A.

Figure 2A:
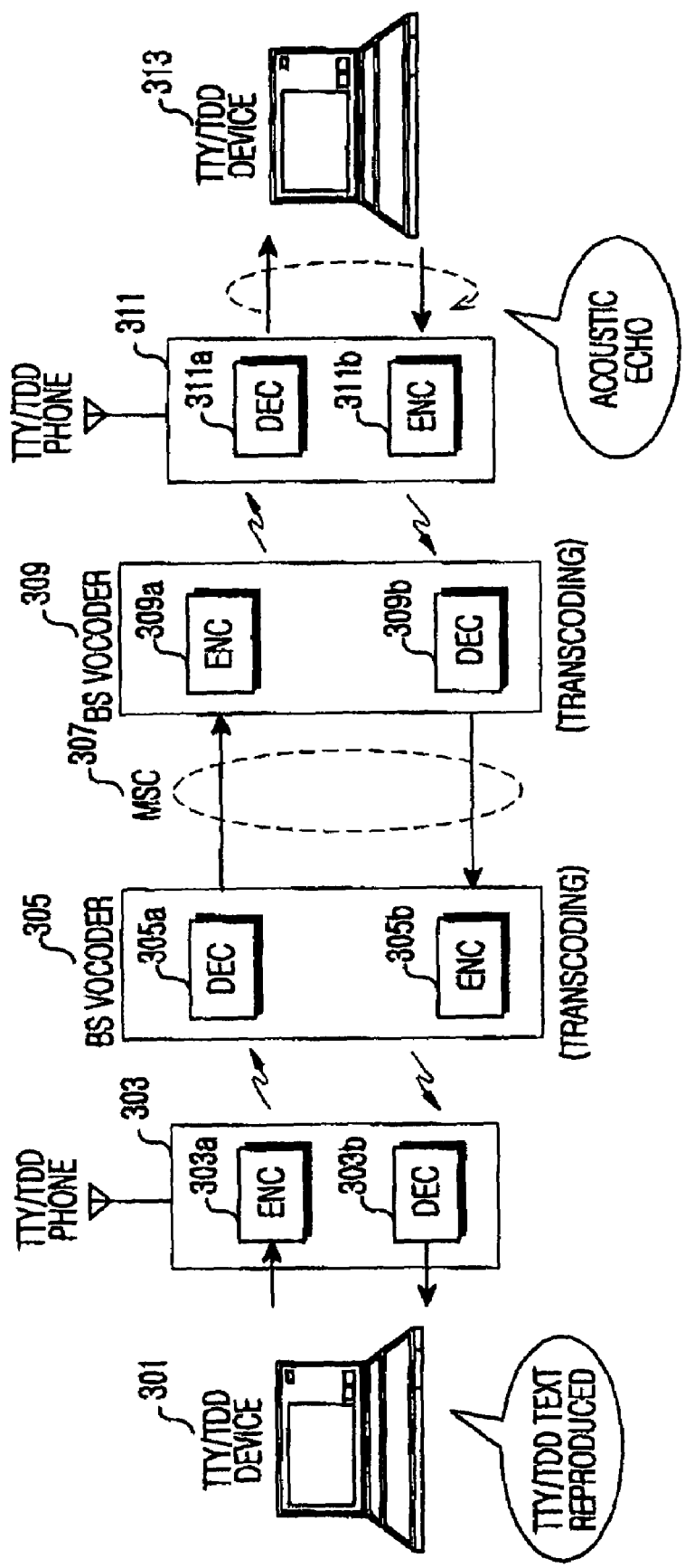
FIGS. 2A and 2B illustrate another conventional communication system providing the TTY/TDD service in which acoustic echo is generated.
Figure 2B:
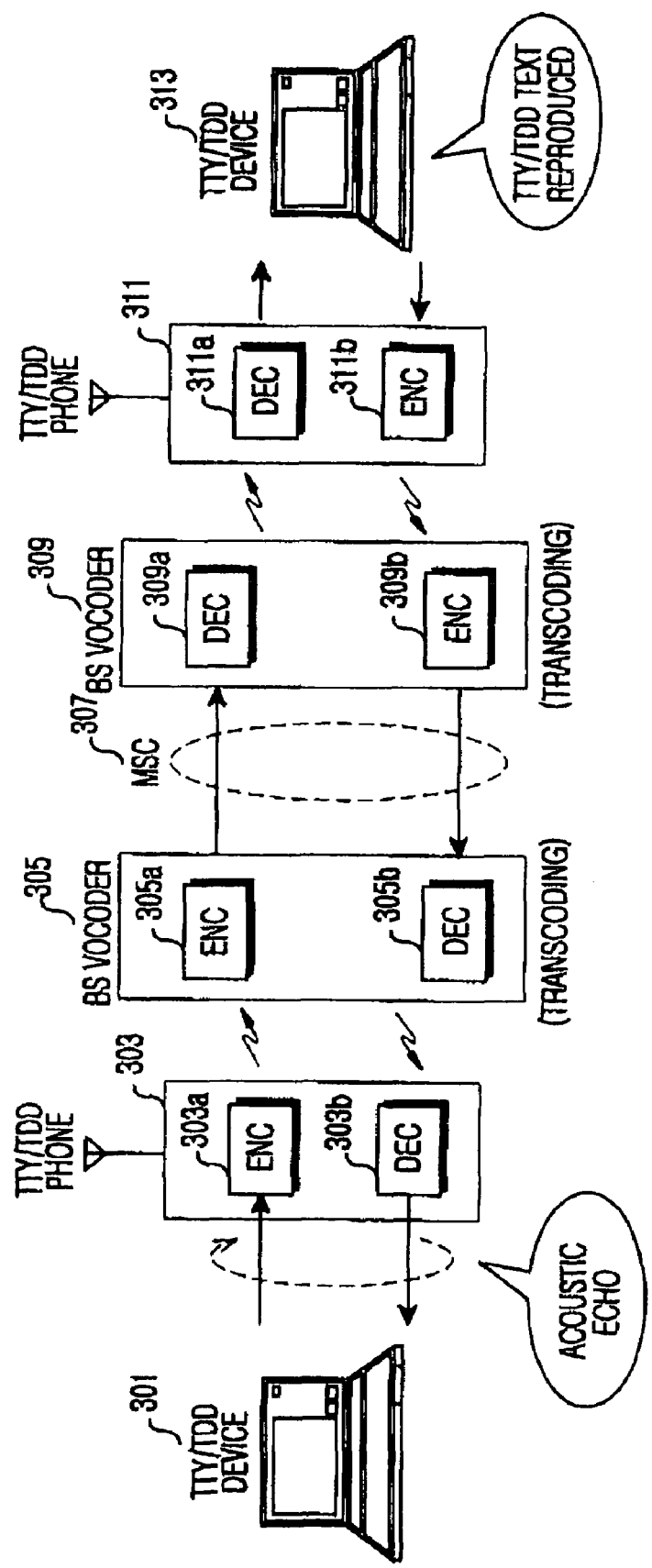

Referring to FIG. 5B, the BS vocoder 309 in accordance with an embodiment of the present invention includes a TTY/TDD text detector 315, a delay counter 317, a PCM mute generator 319, and a switch SW in addition to the decoder 309a and the encoder 309b of the BS decoder 105 illustrated in FIGS. 2A and 2B. A PCM signal received from the MSC 307 is applied to the input of the encoder 309a and the TTY/TDD text detector 315. The encoder 309a encodes the PCM signal and outputs a packet to the TTY/TDD phone 311.

The TTY/TDD text detector 315 detects TTY/TDD text if the PCM signal contains the TTY/TDD text and outputs a detection message representing the detection result. The delay count of the delay counter 317 is set according to the detection result, and the switch SW switches to the MSC 307 one of the outputs of the decoder 309b and the PCM mute generator 319 according to the delay count. A packet received from the TTY/TDD phone 311 is applied to the input of the decoder 309b and the PCM mute generator 319. The decoder 309b decodes the packet and outputs a PCM signal. The PCM mute generator 319 mutes a PCM signal directed to the MSC 307. The switch SW is connected to the output of the decoder 309b and the PCM mute generator 319. The switch SW switches the output of the decoder 309b or the PCM mute generator 319 to the MSC 307 according to the delay count.

Referring to FIGS. 5A and 5B, in parallel with encoder 305a, as described above, the BS vocoder 309 includes the TTY/TDD text detector 315 for detecting TTY/TDD text and outputting a detection message representing the detection result. The BS vocoder 309 also includes the delay counter 317 for counting according to the detection message. In parallel with decoder 305b, as described above, the BS vocoder 309 further includes the PCM mute generator 319 for generating a PCM mute signal during counting in the delay counter 317 and the switch SW.

The second embodiment is implemented in a communication system that has a first BS, a second BS, an MSC 307 for connecting the first BS to the second BS, a first TTY/TDD phone 303 connected wirelessly to the first BS, a second TTY/TDD phone 311 connected wirelessly to the second BS, a first TTY/TDD device 301 connected to the first TTY/TDD phone 303 for transmitting/receiving text information, and a second TTY/TDD device 313 connected to the second TTY/TDD phone 311 for transmitting/receiving text information. The first TTY/TDD device 301 can be connected to the TTY/TDD phone 303 wirelessly or by cable as illustrated in FIG. 5A. In addition, the first TTY/TDD device 301 can be incorporated into the TTY/TDD phone 303. The same means for incorporation can be applied to the second TTY/TDD device 313.

If the TTY/TDD phone 311 fails to prevent an acoustic echo when an MtoM bypass call is set up, the BS vocoder 305 cannot cancel it. On the other hand, when an MtoM transcoding call is set up, the BS vocoder 309 can cancel the acoustic echo according to an embodiment of the present invention.

When the TTY/TDD device 301 transmits TTY/TDD text, acoustic echo from the TTY/TDD phone 311 may cause reproduction of the TTY/TDD text in the TTY/TDD device 301, as illustrated in FIG. 2A. To cancel the acoustic echo, the present invention is implemented not in the BS vocoder 305 but in the BS vocoder 309. This is because when considering delay involved in encoding and decoding of the two TTY/TDD phones and the two BS vocoders, it is preferable to cancel the acoustic echo from the TTY/TDD phone 311 nearest to the TTY/TDD phone 311.

Due to the length of one TTY character (which occupies 7 to 16 frames), and the time required for encoding in the BS vocoder 309 and decoding in the TTY/TDD phone 311, the delay of the PCM signal of a TTY/TDD character received from the TTY/TDD device 301 from its input to the encoder 309a to its feedback to the decoder 309b is set at about 300 ms in the present invention. This delay is a minimum time required for the TTY/TDD text detector 315 to detect TTY/TDD text and operate the PCM mute generator 319 according to the detection result. However, the PCM mute generator 319 cannot be operated continuously since the TTY/TDD device 313 transmits TTY/TDD text. Therefore, the PCM mute generator 319 needs to be off a predetermined time later. In general, one-directional communication is conducted in a half-duplex mode in a TTY/TDD text transmission/reception environment. Therefore, a user of the TTY/TDD phone 303 starts can only start to transmit TTY/TDD text after ensuring that TTY/TDD text received from the TTY/TDD phone 301 is completely output. In accordance with this embodiment of the present invention, an appropriate time delay is 600 ms (refer to step 431 of FIG. 6). This time delay takes into account the time required to read TTY/TDD text, the minimum time required for processing in the PCM mute generator 319 upon detection of TTY/TDD text, and the aforementioned time delay of 300 ms. The time delay is the time for which the PCM mute generator 319 is activated and maintained active.

Figure 6:
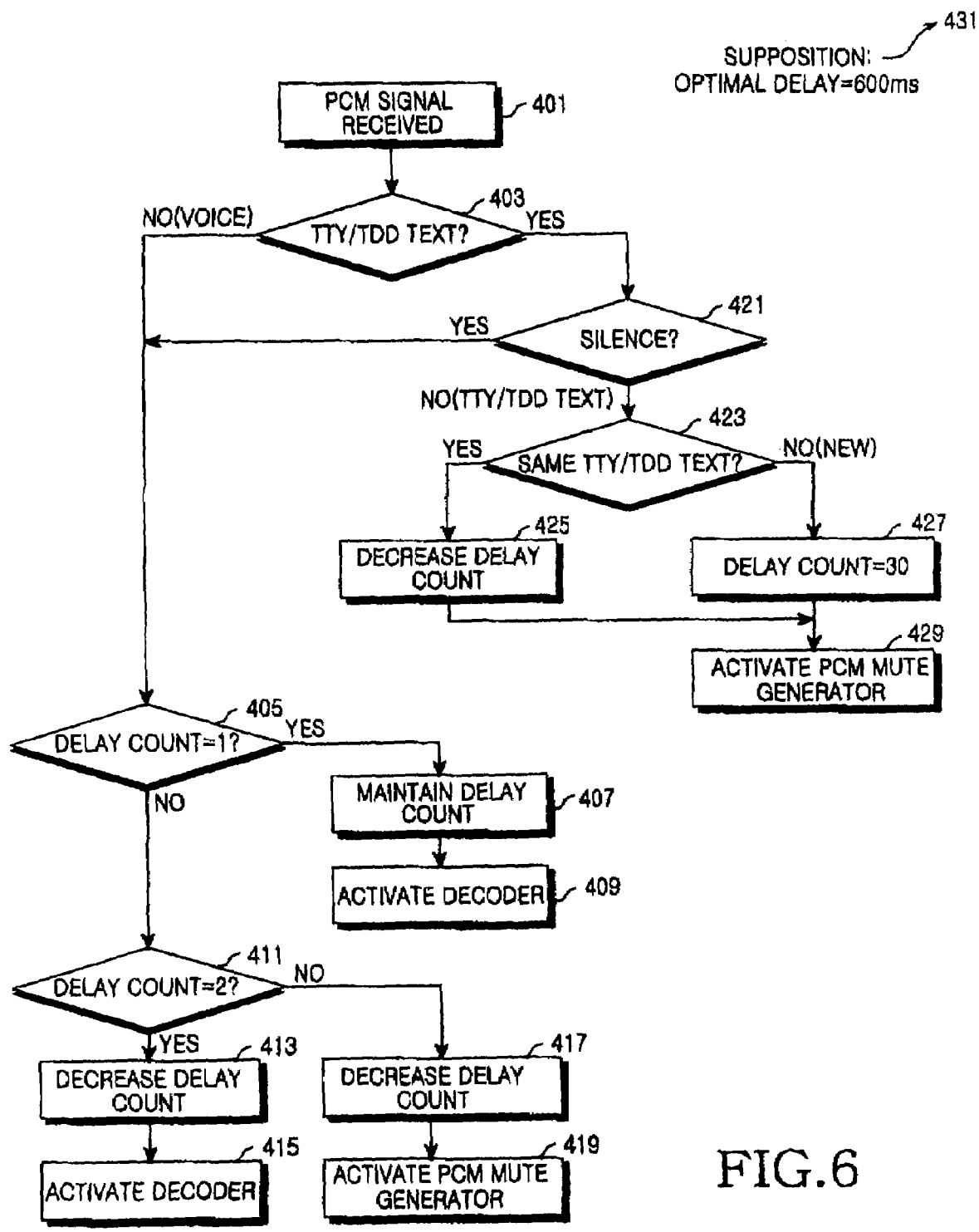
FIG. 6 is a flowchart illustrating an example of operations for providing acoustic echo cancellation according to a second embodiment of the present invention.

FIG. 6 is a flowchart illustrating a method for providing acoustic echo cancellation according to the second embodiment of the present invention. This operation is for canceling acoustic echo generated from the second TTY/TDD phone 311 during transmission of text information from the first TTY/TDD device 301 to the second TTY/TDD device 313. The acoustic echo cancellation method includes the steps of detecting text information in a PCM signal received from the first TTY/TDD device 301 through the MSC 307 in the TTY/TDD text detector 315, and discontinuing text reception from the second TTY/TDD phone 311 for a predetermined time in the decoder 309b of the second BS vocoder 309. The predetermined time is at least the time required for decoding in a decoder 311a and encoding in an encoder 311b of the second TTY/TDD phone 311.

Referring to FIG. 6, the TTY/TDD text detector 315 receives a PCM signal from the MSC 307 in step 401. If a current frame includes TTY/TDD text, the value of the delay counter 317 is set to 30; that is, the number of frames corresponding to 600 ms in step 427. Then the PCM mute generator 319 is activated in step 429. This implies that the switch SW switches such that the PCM mute generator 319 outputs a PCM mute signal.

Meanwhile, if the TTY/TDD text detector 315 detects mute, voice, or the same TTY/TDD text as the previous one, the value of the delay counter 317 is decreased in step 413, 417, or 425. If the count is 1, the PCM mute generator 319 is off and instead, the decoder 309b is on.

If the count is not 1, the PCM mute generator 319 is maintained activated in step 419. Since the count cannot be 1 even if the same TTY/TDD text is received and the delay counter 317 is decreased as in step 425, the PCM mute generator 319 is maintained activated in step 419. This is because one TTY/TDD character is transmitted in 7 to 16 frames and the count is 15 even when the TTY/TDD character is 16 frames long.

If the received signal is not TTY/TDD text but voice in step 403, steps 405 to 419 are performed. In step 405, it is determined whether the count is 1. If the count 1, which implies that the echo of the TTY/TDD text has been substantially cancelled, the count is maintained in step 407 and the decoder 309*b* is on.

If the count is 2 in step 411, it is decreased in step 413 and the decoder 309*b* is on in step 415, similarly to the case where the count is 1.

If the count is neither 1 nor 2 in steps 405 and 411, which implies that the ITY/TDD echo generated in the previous frame has not been substantially cancelled, the count is decreased in step 417 and the PCM mute generator 319 is on in step 419.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for canceling acoustic echo generated from a public switched telephone network (PSTN) during transmission of text information from a base station (BS) to the PSTN in a communication system having the BS, a mobile station (MS) connected wirelessly to the BS, having a teletype/telecommunications device for the deaf (TTY/TDD) device for transmitting and receiving text information, the PSTN, a mobile switching center (MSC) for connecting the BS to the PSTN, and a land phone connected to the PSTN by cable, the method comprising:
   determining whether a data signal is inputted from the MS, the data signal is transmitted to the BS, and the transmitted data signal comprises text information, when a call between the MS and the land phone is set and the data signal is Generated from the TTY/TDD device;
   generating a blank packet including silence information in the BS if the text information is detected in the transmitted data signal; and
   transmitting the blank packet to the TTY/TDD device of the MS for canceling acoustic echo generated from the land phone.

2. The method of claim 1, wherein a vocoder of the BS detects the text information from the data signal and outputs a detection message representing a detection result.

3. The method of claim 1, wherein the vocoder of the BS generates the blank packet responding to the detection message.

4. The method of claim 1, wherein the MS separately has a TTY/TDD functionality and the TTY/TDD performs a process of canceling the acoustic echo.

5. A device for canceling acoustic echo generated from a public switched telephone network (PSTN) during transmission of text information from a base station (BS) to the PSTN in a communication system having the BS, a mobile station (MS) connected wirelessly to the BS, having a teletype/telecommunications device for the deaf (TTY/TDD) device for transmitting and receiving text information, the PSTN, a mobile switching center (MSC) for connecting the BS to the PSTN, and a land phone connected to the PSTN by cable, the device comprising:
   a detector adapted to determine whether a data signal from the TTY/TDD device is transmitted and received through the MS, and text information is included in the received data signal; and
   a packet generator adapted to generate a blank packet including silence information responding to the result of the detector and to transmit the blank packet to the TTY/TDD device through the MS for canceling acoustic echo generated from the land phone.

6. A device for canceling acoustic echo generated from a second mobile station (MS) during transmission of text information from a first teletype/telecommunications device for the deaf (TTY/TDD) device to a second TTY/TDD device in a communication system when a transcoding call between a first mobile station (MS) and the second MS is established and a data signal is generated from the first TTY/TDD device, the communication system comprising a first base station (BS), a second BS, a mobile switching center (MSC) for connecting the first and second BSs, the first MS connected wirelessly to the first BS, the first MS having the first TTY/TDD device for transmitting and receiving text information, and the second MS connected wirelessly to the second BS, the second MS having the second TTY/TDD device for transmitting and receiving text information, the device comprising:
   a detector adapted to determine whether the data signal is received from the first BS, the received data signal is transmitted through the MS, and text information is included in the data signal transmitted in the second BS;
   a delay counter adapted to set a delay count and to perform the delay count operation responding to the determination result of the detector; and
   a mute signal generator adapted to generate a signal to mute a signal directed to the MSC according to the value of the delay count and output the generated signal.

7. The vocoder of claim 6, wherein the value of set delay count is at least the time required for decoding in a decoder and encoding in an encoder of the second MS.

8. The device of claim 5, wherein the detector detects text information from the data signal and then outputs a detection message comprising the determination result.

9. The device of claim 5, wherein the packet generator generates the blank packet responding to the detector result.

10. The device of claim 5, wherein the MS comprises the TTY/TDD device, which is not separately constructed.

11. The device of claim 6, wherein the detector is adapted to detect text information from the data signal and then outputs the a detection message according to the determination result.

12. The device of claim 6, wherein the delay counter is adapted to set the value of the delay count responding to a detection message according to the determination result of the detector.

13. The device of claim 6, wherein the MS comprises the TTY/TDD device, which is not separately constructed.

14. The device of claim 6, wherein the delay count operation is adapted to cancel the text information received from the second MS responding to the value of the delay count in the vocoder of the second BS.

* * * * *